United States Patent Office 3,282,000
Patented Nov. 1, 1966

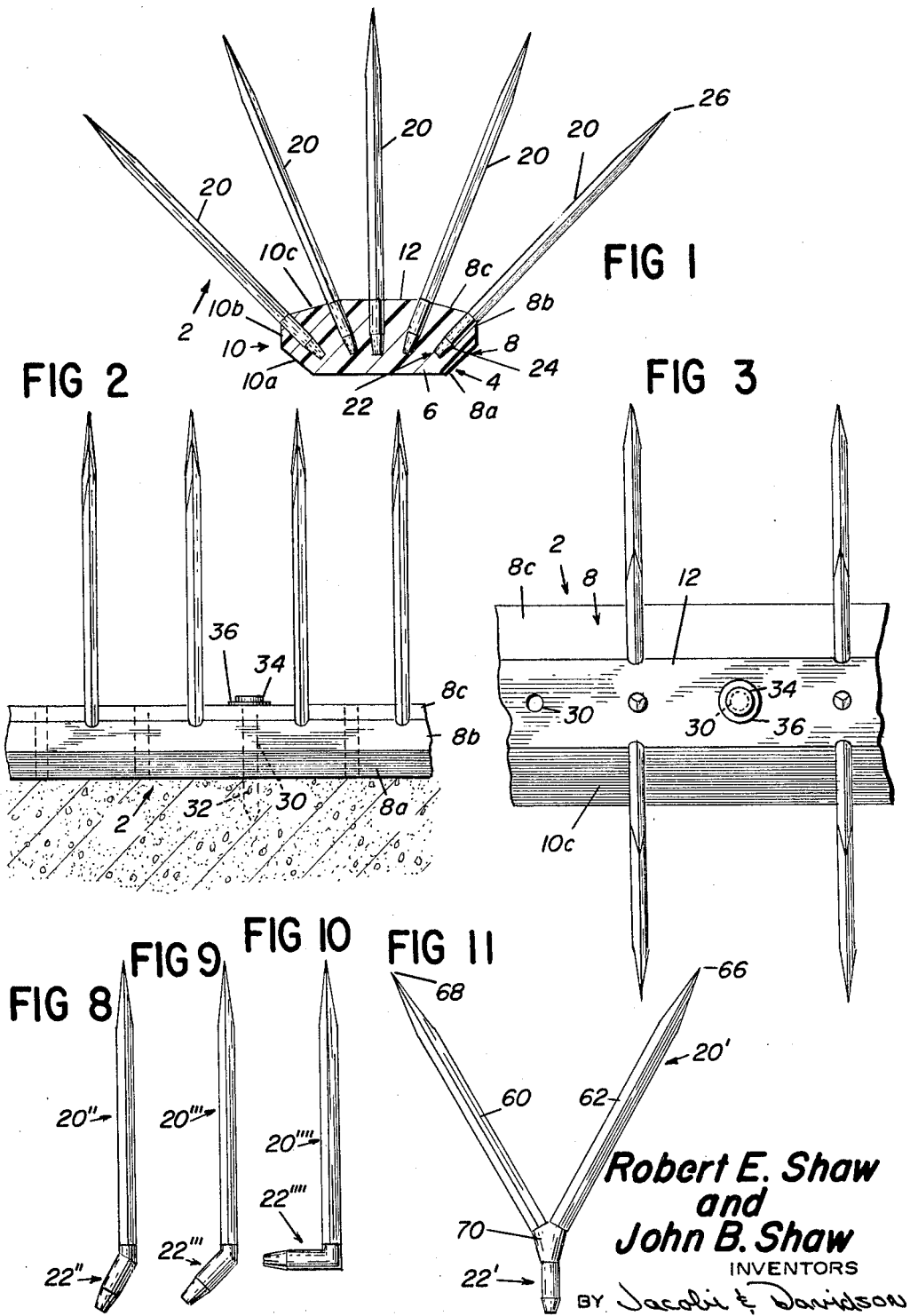

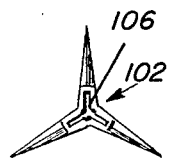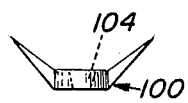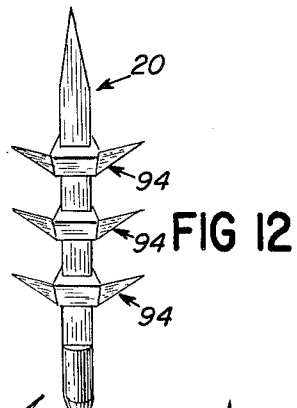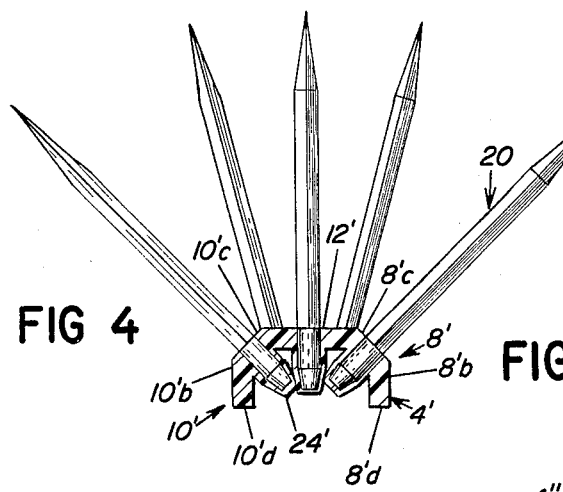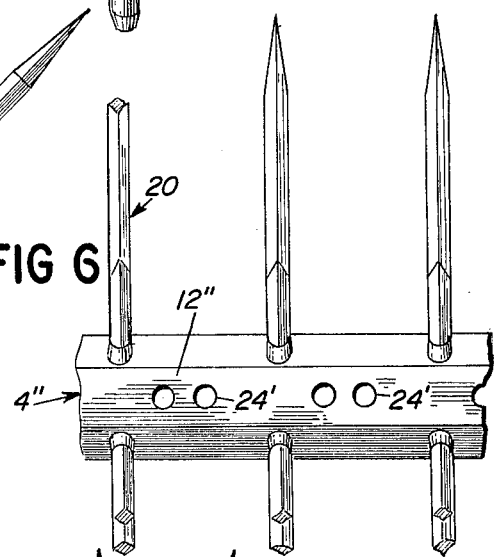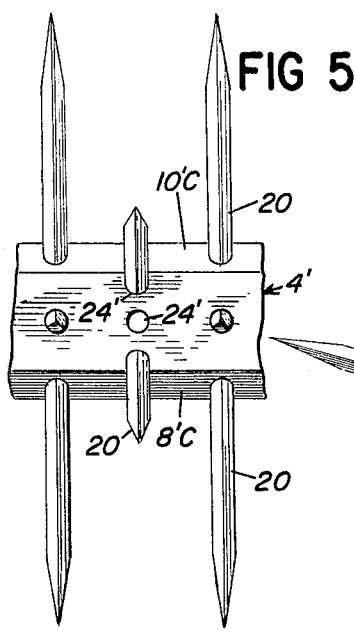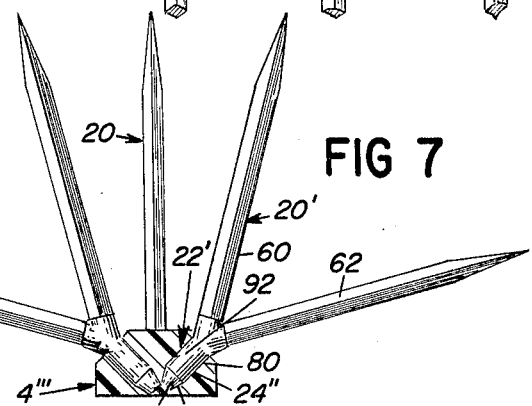

3,282,000
BIRD PROOFING DEVICE
John B. Shaw and Robert E. Shaw, both c/o 900 First
National Bank Bldg., Johnstown, Pa.
Filed Aug. 22, 1963, Ser. No. 303,866
10 Claims. (Cl. 52—101)

This invention relates to bird proofing assemblies, and is particularly concerned with a new bird proofing device which can be easily installed, which is efficient in operation, which does not detract from the appearance of a building or other structure on which it is used, and which does not interfere with rescue operations from a building or other structure to which the invention is applied.

There have been various prior suggestions as to the provision of bird proofing devices which can be attached to the exterior surface of a structure to prevent birds from accumulating resting, or living thereon. Commonly, such devices are attached, for example, to church steeples, spires, window sashes, frames, sills, ledges or the like. In the sense of placement, the invention is used basically in the same manner as the prior devices, namely, it is adapted to be attached to the usual exterior surfaces of a structure so as to prevent birds alighting thereon.

Aside from the placement or positioning aspects, the invention departs from the prior art by eliminating complications in assembly and structure, complications in installation, and excess costs now otherwise experienced with available bird proofing devices.

Specifically, it is a primary object of the present invention to provide a simply constructed and simply installed bird proofing device which is efficient in operation and free of many disadvantages heretofore inherent in the use of bird proofing devices.

Still further, important, but somewhat more specific objects of the present invention include: (a) the provision of a bird proofing device conforming with the preceding discussion and which can be formed from plastics, synthetics, and inexpensive metals so as to be available at low cost; (b) the provision of such bird proofing device which is so constructed that it can be easily fastened on any exterior surface, regardless of its contour—i.e., whether the surface be curved or straight; (c) the provision of such a bird proofing device which includes separable parts that can be easily coupled together during final installation whereby the device can be easily handled and packaged and easily shipped without excessive bulk or danger in handling; (d) the provision of such a bird proofing device which can be installed with the use of normal tools and by persons possessing no particular skill or dexterities; (e) the provision of such a bird proofing device which is adapted to incorporate spike elements of differing size and shape whereby the device, as installed, can be effective against various differing types of birds including the most common "problem birds," namely pigeons and starlings; (f) the provision of such a bird proofing device which can be fabricated in accordance with mass production techniques and in various colors thereby rendering the device available for widespread use on a multitude of structures without detracting from the aesthetic qualities of the structure; and (g) the provision of such a device which is so constructed that spike or barbed elements thereof can be easily removed from protruding positions so as to not interfere with a rescue operation, such as, for example, a fire rescue through a window having the invention installed on the sill thereof.

The invention resides in the combination arrangement disposition cooperation and form of the parts of an assembly constructed in accordance herewith. The invention will be better understood, and objects other than those specifically set forth above will become apparent, when consideration is given to the following detailed description. Such description makes reference to the annexed drawings presenting preferred and illustrative embodiments of the invention.

FIGURE 1 is a transverse view, partially in section, of a preferred form of bird proofing device constructed in accordance herewith;

FIGURE 2 is a side view of the device shown in FIGURE 1;

FIGURE 3 is a plan view of the device shown in FIGURE 1;

FIGURE 4 is a transverse view, partially in section, of a modified form of bird proofing device constructed in accordance herewith;

FIGURE 5 is a plan view of the device shown in FIGURE 4;

FIGURE 6 is a plan view of a modification of the device shown in FIGURES 4 and 5;

FIGURE 7 is a transverse view of a further modified form of bird proofing device constructed in accordance herewith;

FIGURES 8 through 12 are respectively side elevational views of modified forms of spiked elements provided hereby for use in the bird proofing devices shown in FIGURES 1 through 7;

FIGURE 13 is a side view of a barbed attachment adapted to be used on spike elements constructed in accordance herewith; and, FIGURE 14 is a plan view of a modified form of attachment adapted to be used with spike elements formed according to the invention.

Referring first to FIGURES 1 through 3, the bird proofing device shown therein is generally designated by the numeral 2. The device 2 comprises an elongated strip-type base support 4 having a bottom surface 6, at least partially sloped side walls 8 and 10 extending upwardly from the bottom surface 6, and a top wall 12 joining the side walls and spaced from the bottom surface 6.

The side walls 8 and 10 each comprise an outwardly flared or sloped bottom portion, 8a and 10a respectively, a vertically extending central portion, 8b and 10b respectively, and an inwardly sloped upper portion, 8c and 10c respectively.

The elongated strip-type base support 4 has a plurality of rows of sockets 24 disposed therein. The sockets 24, as shown, open onto the side walls 8 and 10, and also onto the top wall 12. The sockets are provided so as to releasably but tightly receive a plurality of projecting shaft elements 20.

Each of the shaft elements 20 has a plug 22 at one end thereof, which plug is shaped to be tightly received in an associated socket 24. The upper end of each shaft element 20, i.e., the end thereof opposite that carrying the plug 22, is pointed sharply, as at 26. As will be apparent from the drawings, each of the shaft elements 20 has the plug 22 thereon disposed in a different one of the sockets 24 whereby the shaft elements extend from different sockets 24 and project upwardly, and essentially radially, from the base support 4.

Although sockets 24 have been shown as opening onto the top wall as well as the side walls, it is only essential that the sockets open onto one wall or one group of walls of the base support. Preferably, the sockets 24 at least open onto the side walls of the base support 4. However, in any event, the sockets 24 are so spaced on the walls of the base support and the shaft elements are so disposed with respect to the sockets, that the distance between adjacent sockets having a shaft element extending therefrom is substantially less that the length of the shaft elements.

The particular spacing between the shaft elements, and necessarily between the sockets, is important because it is this spacing which prevents a bird from alighting on the base support—i.e., the spacing should be such that a bird cannot fit between adjacent shaft elements. Still further, the length of the shafts should be such that the bird cannot stretch his legs so as to be able to descend on the base support without the shaft elemens contacting the bird. To this latter end, the shaft elements have a substantial length with respect to the depth of the base support, and preferably a length of the order of three to four inches.

Notwithstanding the above discussion with respect to particular lengths and/or other dimensions, it should be understood that the important factor under consideration is the provision of spiked shaft elements which are so dimensioned and positioned as to prevent a bird from alighting on or adjacent the base support. Under particular conditions, some longer shaft elements may be provided with some shorter shaft elements, or all of the shaft elements may be of a given size. In any event, the dimensioning and spacing is such as to eliminate the possibility of having the undesired bird alight on an area with which the device of the invention is associated.

As indicated above, the shaft elements 20 project generally radially from the base support 4 of FIGURE 1. Phrased another way, shaft elements extending from the sockets along one of the side walls of the base support have longitudinal axes disposed angularly to the longitudinal axes of shaft elements extending from the sockets disposed along the other side wall.

To secure the base support 4 of FIGURE 1 to an adjacent surface, the same is preferably provided with apertures or bores 30 extending vertically therethrough. The bores 30, as shown in FIGURES 2 and 3, are adapted to receive securing elements such as the nail 32. However, it will be understood that a bolt or other fastening device can be used in place of the nail 32. Regardless of form, the securing device is most satisfactory if it is provided with a head such as 34, and if it is used in association with a washer such as 36 adjacent the upper end of the bore or aperture 30.

It will be appreciated that a base support such as described above can be manufactured in lengths, and then cut to particular size so as to fit on a given ledge, sill, or the like. Moreover, if formed from a plastic, synthetic, or bendable metal, the base support is adapted to be attached to diverse different types of surfaces, including flat surfaces and arcuately contoured surfaces. Preferably, a multitude of apertures or bores 30 are incorporated along the length of the base support so that as many fastening elements can be used with a given base support as may be necessary to secure the same properly in place.

While specific reference has been made hereinabove to the preferred embodiment of the invention presented in FIGURES 1 through 3, the same considerations are applicable to the embodiment of FIGURES 4 and 5, the embodiment of FIGURE 6, and the embodiment of FIGURE 7. In each instance, there is a bird proofing device comprising an elongated strip-type base support, and a plurality of elongated shaft elements. Moreover, in each instance, the shaft elements and the base support have cooperating socket and plug connectors for releasably securing the shaft elements to the base support at spaced apart locations along the base support.

In the arrangement of FIGURES 4 and 5, the shaft elements utilized are identical with the shaft elements shown in FIGURE 1, and accordingly are similarly designated by the numeral 20. The base support itself, however, takes a somewhat different form in the embodiments of FIGURES 4 and 5. As best shown in FIGURE 4, the base support 4' has essentially an open bottom. The side walls 8' and 10' each have bottom surfaces 8d' and 10d' respectively which form the bottom surface of the base support. The side walls 8' and 10' moreover, include only a vertically upstanding portion, 8b' and 10b' respectively, and an inwardly sloped upper portion 8c' and 10c' respectively. A top wall 12' extends between the upper inwardly sloped portions 8c' and 10c'. In essence, the base support of the FIGURE 4 arrangement is a hollow type of support, whereas the base support of the FIGURE 1 arrangement is a solid type support. Still, with both embodiments, the base support can be formed as a strip-type element, and in each instance, the base support can be formed, as shown, with socket recesses, the socket recesses in the embodiment of FIGURE 4 being designated by the numeral 24'.

FIGURE 5 is a plan view of the arrangement shown in FIGURE 4, and by reference to FIGURE 5, it will be noted that the top wall 12' of the base support 4' has a plurality of socket recesses 24' which are offset longitudinally with respect to the corresponding socket recesses in the side wall portions 8c' and 10c'. This offset relation is desired in certain instances because it permits a spreading of the spiked shaft elements over the entire base support so as to more effectively provide barbs over a given area. Still, insofar as the basic unit is concerned, the arrangement of FIGURES 4 and 5 correspond with the arrangement of FIGURES 1 through 3.

The same is true with respect to the embodiment of FIGURE 6 and the embodiment of FIGURE 7. In the embodiment of FIGURE 6, the base support is designated by the numeral 4', but the spike shaft elements are again designated by the numeral 20 since they correspond identically with the spike shaft elements previously described. The difference between the embodiment of FIGURE 6 and the embodiment of FIGURES 4 and 5 resides in the fact that with the embodiment of FIGURE 6, only one longitudinally aligned row of sockets 24' are incorporated in the top wall 12", whereas in the arrangement of FIGURES 4 and 5, a plurality of longitudinal rows of aligned sockets 24' are used.

In FIGURE 7, the base support is designated by the numeral 4''', and in essence, this base support incorporates a combination of the features utilized in the base support of FIGURE 1 and the base support of FIGURE 4. More particularly, the outer configuration of the base support 4''' corresponds identically with the outer configuration of the base support 4' of FIGURE 4. However, the base support 4''' is a solid structure thus resembling the base support 4 of FIGURE 1 in this respect. Still, the base support 4''' has a plurality of sockets 24'' therein which receive shaft elements, here designated respectively by the numerals 20 and 20'. The shaft element 20 corresponds to the other shaft elements described above, but the shaft 20' is a two-member structure including diverging arms or shaft members 60 and 62.

The shaft element 20' is shown alone in FIGURE 11, and by reference to such figure, it will be noted that the pair of arms or shaft members 60 and 62 are each joined at one end to a common plug 22'. The opposite ends of each of the shaft members are sharply pointed as at 66 and 68 respectively. The plug 22' is virtually identical with the plug 22 described above, except that the same further incorporates a coupling section 70 which serves as the junction between the base of both of the shaft members 60 and 62 and the portion of the plug 22' which fits within an associated socket 24, 24' or 24", as the case may be.

More specifically, by reference to the various figures, it will be noted that each of the sockets shown in the base supports, regardless of the embodiment, comprises a recess. The recesses are of identical configuration, and to describe the same, reference is only made to FIGURE 7, but subject to the understanding that the description is applicable to the recesses 24 and 24', as well as to the recess 24".

By again referring to FIGURE 7, it will be noted that the recess 24" has a first cylindrical portion 80 opening upwardly of the base support 4''', and a second frusto-conical portion 82 which is disposed within the base support contiguous to, but under, the first cylindrical portion 80. The plug 22', or the plugs 22, have a corresponding configuration, namely, each plug comprises a lower frusto-conical base portion 90 and an upper contiguous cylindrical portion 92. The lower frusto-conical portion 90 is dimensioned to fit within the frustro-conical portion 82 of the recess, and similarly, the upper cylindrical portion 92 of the plug is dimensioned to fit within the cylindrical portion 80 of the recess. The fit is, consistent with the invention, a tight frictional fit which serves to maintain the plugs within a respective socket so as to fix the shaft members associated therewith in position. At the same time, the fit provides a removable or releasable fastening between the plug and the base support so that the shaft members and associated plugs can be removed from a base support as desired, or inserted therein, as desired.

It will be understood that it is by virtue of the cooperating plug and socket arrangement described above that the invention lends itself to easy assembly and disassembly, and in turn, to easy shipping and installation. Furthermore, the base support can be used, as indicated, with various types of shaft elements, including a single shaft member, or a pair of shaft members, for example.

Alternative to the shaft members described above, still different forms of shaft members are shown in FIGURES 8, 9, 10 and 12. In FIGURE 8, the plug member 22' of the shaft element 20" is offset slightly angularly with respect to the longitudinal axis of the shaft element or member. In FIGURE 9, the plug member 22''' is offset more severely with respect to the longitudinally axis of the shaft element 20'''. In FIGURE 10, the plug element 22'''' is at right angles to the shaft element 20''''. In the construction of FIGURES 8, 9 and 10, the basic arrangement is the same, the difference residing only in the disposition of the plug with respect to the longitudinal axis of the particular shaft element. In contrast, in FIGURE 12, the original and basic shaft element 20 is utilized, but the same is formed with lateral projections or spikes 94 extending therefrom. During the initial formation of the modified shaft element 20 of FIGURE 12, the lateral projections or spikes can be integrally molded therewith. Similarly, as should be apparent, the double shaft member arrangement of FIGURE 11, or the offset plug arrangements of FIGURES 8, 9 and 10 can be provided on a shaft element which is molded as one integral piece.

As a further modification to the arrangement shown in FIGURE 12, it may be found desirable to provide separate pieces to be used with or attached to basic shaft element 20 as desired. Thus, as shown in FIGURES 13 and 14, separate parts 100 and 102 can be provided with a unit constructed in accordance herewith. Each of these parts has a central opening 104 and 106 respectively which adapts the part to be moved onto one of the basic shaft elements, and by virtue of a frictional fit, to be retained thereon.

After reading the foregoing detailed description, one should appreciate that the present invention readily adapts itself to molding techniques such as are commonly used in the formation of plastic, or synthetic, or certain metal elements. Thus, the various pieces of the assembly can be inexpensively fabricated and supplied to any user for a simple installation. Notwithstanding the simplicity of the construction, the same proves effective during use, and can be made in various colors so as to blend with a building or other structure with which the invention is to be associated. With an appreciation of these detailed factors, and the other general factors discussed above, it should be apparent that the objects set forth at the outset of the present specification have been successfully achieved. Accordingly,

What is claimed is:

1. A bird proofing device comprising:
   (a) an elongated strip-type base support having a bottom surface, side walls extending upwardly from said bottom surface, and a top wall joining said side walls and spaced from said bottom surface;
   (b) at least one of said side and top walls having a plurality of recessed sockets spaced therealong;
   (c) a plurality of elongated shaft elements;
   (d) said shaft elements having a plug at one end thereof, said plug being shaped to be tightly received in said sockets;
   (e) said shaft elements being sharply pointed at the opposite ends thereof;
   (f) the plug on each of said shaft elements being disposed in one of said sockets whereby said shaft elements each extend from a different one of said sockets;
   (g) said sockets being so spaced on said side walls of said base support, and said shaft elements being so disposed with respect to said sockets that the distance between adjacent sockets having a shaft element extending therefrom is less than the length of said shaft members;
   (h) at least some of the shaft elements extending from the sockets along said base support having longitudinal axes disposed angularly to the longitudinal axes of other shaft elements extending from the sockets disposed along the base support;
   (i) the depth of said base support being substantially less than the length of said shaft elements.

2. A bird proofing device as defined in claim 1 wherein said top wall of said base support has a plurality of recessed sockets spaced therealong, wherein said side walls are at least partially sloped, and wherein at least some of said plurality of shaft elements have the plug thereon disposed in said sockets in said top wall whereby said shaft elements extend therefrom.

3. A bird proofing device as defined in claim 1 wherein each of said sockets comprises a recess in said base support having a first cylindrical portion opening upwardly of said base support and a second frustro-conical portion disposed within said base support contiguous to, but under, said first cylindrical portion, and wherein each of said plugs comprises a lower frustro-conical base portion and an upper contiguous cylindrical portion.

4. A bird proofing device as defined in claim 3 wherein at least one of said shaft elements comprises a pair of shaft members angularly disposed with respect to one another and each joined at one end to a common plug.

5. A bird proofing device as defined in claim 3 wherein at least one of said shaft elements has the plug at one end thereof offset angularly with respect to the longitudinal axes of said one shaft element.

6. A bird proofing device as defined in claim 3 wherein at least one of said shaft elements has a plurality of laterally projecting pointed elements extending therefrom between the ends thereof.

7. A bird proofing device as in claim 1 wherein said shaft elements have a length between three and four inches.

8. A bird proofing device as in claim 1 wherein at least one of said shaft elements comprises a pair of shaft members joined at one end to a common plug, said shaft members and common plug having the form of a Y.

9. A bird proofing device as in claim 8 wherein the shaft members forming the legs of the Y lie in different planes.

10. A bird proofing device as in claim 1 wherein at least one of said shaft elements has a plurality of laterally projecting pointed elements extending therefrom between the ends thereof.

References Cited by the Examiner

UNITED STATES PATENTS

| | | | |
|---|---|---|---|
| 2,777,171 | 1/1957 | Burnside et al. | 52—101 |
| 2,888,716 | 6/1959 | Kaufmann | 52—101 |
| 2,938,243 | 5/1960 | Peles | 52—101 |

HARRISON R. MOSELEY, *Primary Examiner.*

A. I. BREIER, *Assistant Examiner.*